(12) United States Patent
Mueller

(10) Patent No.: US 12,299,641 B2
(45) Date of Patent: May 13, 2025

(54) SYSTEMS AND METHODS FOR ORGANIZING AND SHARING CONTACT AND CALENDAR INFORMATION

(71) Applicant: CIRQIL, Inc., Los Angeles, CA (US)

(72) Inventor: Brigitte Mueller, Los Angeles, CA (US)

(73) Assignee: CIRQIL, Inc., Los Angeles, CA (US)

( * ) Notice: Subject to any disclaimer, the term of this patent is extended or adjusted under 35 U.S.C. 154(b) by 0 days.

(21) Appl. No.: 17/265,488

(22) PCT Filed: Aug. 1, 2019

(86) PCT No.: PCT/US2019/044735
§ 371 (c)(1),
(2) Date: Feb. 2, 2021

(87) PCT Pub. No.: WO2020/028710
PCT Pub. Date: Feb. 6, 2020

(65) Prior Publication Data
US 2021/0312396 A1     Oct. 7, 2021

Related U.S. Application Data

(60) Provisional application No. 62/714,592, filed on Aug. 3, 2018.

(51) Int. Cl.
| | |
|---|---|
| *G06Q 10/107* | (2023.01) |
| *G06F 21/60* | (2013.01) |
| *H04L 9/08* | (2006.01) |
| *H04L 67/306* | (2022.01) |
| *H04W 4/02* | (2018.01) |
| *H04L 9/00* | (2022.01) |
| *H04L 61/4594* | (2022.01) |

(52) U.S. Cl.
CPC ......... *G06Q 10/107* (2013.01); *G06F 21/604* (2013.01); *H04L 9/0872* (2013.01); *H04L 67/306* (2013.01); *H04W 4/025* (2013.01); *G06F 2221/2111* (2013.01); *H04L 9/50* (2022.05); *H04L 61/4594* (2022.05)

(58) Field of Classification Search
None
See application file for complete search history.

(56) References Cited

U.S. PATENT DOCUMENTS 8,255,464 B2 * 8/2012 Wilkins .............. G06F 16/9554
709/206
8,588,382 B2 * 11/2013 Paden ................. H04M 3/2263
379/32.01

(Continued)

FOREIGN PATENT DOCUMENTS

WO    WO 2000/067105     11/2000
WO    WO-2020060546 A1 *   3/2020 ............. G06Q 10/10

*Primary Examiner* — Lashonda Jacobs-Burton
(74) *Attorney, Agent, or Firm* — Knobbe Martens Olson & Bear LLP

(57) ABSTRACT

Some embodiments provide a system or a method to facilitate communication between people. The user can have control over which contact information fields are initially shared and subsequently updated with each contact. The system may also store information about when and how a contact was created. The system may also use blockchain to secure and store user information.

17 Claims, 9 Drawing Sheets

(56) References Cited

U.S. PATENT DOCUMENTS

| | | | |
|---|---|---|---|
| 9,037,645 B2* | 5/2015 | Czajka | H04L 67/306 709/216 |
| 9,165,327 B1* | 10/2015 | Hyndman | G06Q 50/01 |
| 9,882,918 B1* | 1/2018 | Ford | H04L 63/14 |
| 9,928,272 B1* | 3/2018 | Niyogi | G06F 16/4387 |
| 10,237,713 B1* | 3/2019 | Lifschultz | H04B 5/77 |
| 10,346,868 B2* | 7/2019 | Pfeffer | G06Q 30/0226 |
| 10,374,892 B2* | 8/2019 | Xia | H04L 41/0846 |
| 10,377,147 B2* | 8/2019 | Liu | B25J 15/0023 |
| 10,614,276 B2* | 4/2020 | Iizuka | H04W 4/21 |
| 10,616,368 B2* | 4/2020 | Sodaitis | G06Q 10/10 |
| 10,743,151 B2* | 8/2020 | Purohit | H04W 4/21 |
| 10,992,612 B2* | 4/2021 | Burbank | H04L 51/216 |
| 11,102,636 B1* | 8/2021 | Lifschultz | G06Q 10/107 |
| 11,157,878 B2* | 10/2021 | Dorfman | H04M 1/27453 |
| 2004/0162812 A1* | 8/2004 | Lane | G06Q 30/02 |
| 2004/0203896 A1* | 10/2004 | Deigin | H04W 64/00 455/556.1 |
| 2005/0192008 A1 | 9/2005 | Desai et al. | |
| 2007/0129959 A1* | 6/2007 | Bransky | H04M 1/2757 455/73 |
| 2008/0010128 A1* | 1/2008 | Allen | G06Q 30/0271 705/14.67 |
| 2009/0181653 A1* | 7/2009 | Alharayeri | H04L 67/51 455/414.1 |
| 2009/0250513 A1* | 10/2009 | Shoemaker | H04B 5/20 705/17 |
| 2009/0265794 A1* | 10/2009 | Apelqvist | G06Q 10/10 726/30 |
| 2010/0280904 A1* | 11/2010 | Ahuja | G06Q 30/0261 709/204 |
| 2011/0113084 A1* | 5/2011 | Ramnani | H04W 4/16 709/201 |
| 2012/0203821 A1* | 8/2012 | Czajka | G06F 16/285 709/203 |
| 2013/0217365 A1* | 8/2013 | Ramnani | H04L 67/306 455/414.1 |
| 2013/0246524 A1* | 9/2013 | Berner | G06Q 50/01 709/204 |
| 2013/0311892 A1* | 11/2013 | Hsieh | G06Q 10/1095 715/738 |
| 2014/0082074 A1* | 3/2014 | Workman | H04L 67/10 709/204 |
| 2014/0122605 A1* | 5/2014 | Merom | G06Q 10/10 709/204 |
| 2014/0164129 A1* | 6/2014 | Joshi | G06Q 30/0261 705/14.58 |
| 2014/0289342 A1* | 9/2014 | Turakhia | G06Q 50/01 709/224 |
| 2015/0134603 A1* | 5/2015 | Melamed | G06Q 50/01 707/692 |
| 2015/0178312 A1* | 6/2015 | Pant | H04W 4/023 707/722 |
| 2015/0205822 A1* | 7/2015 | Jain | G06F 16/24578 707/803 |
| 2015/0205842 A1* | 7/2015 | Jain | G06Q 10/10 707/732 |
| 2016/0037331 A1* | 2/2016 | Vernon | H04L 51/58 455/414.1 |
| 2016/0192121 A1* | 6/2016 | Jain | G06Q 50/01 455/41.2 |
| 2016/0307477 A1* | 10/2016 | Cox | G09F 19/228 |
| 2016/0335599 A1* | 11/2016 | Kawanabe | H04L 67/10 |
| 2017/0034139 A1* | 2/2017 | Passichenko | H04L 63/0428 |
| 2017/0272393 A1* | 9/2017 | Nimushakavi | H04L 12/1822 |
| 2017/0330174 A1 | 11/2017 | Demarinis et al. | |
| 2017/0359301 A1* | 12/2017 | Shah | H04L 61/4594 |
| 2018/0041571 A1* | 2/2018 | Rogers | H04L 67/104 |
| 2018/0053163 A1* | 2/2018 | Khanani | G06Q 20/3274 |
| 2018/0060017 A1* | 3/2018 | Lauck | H04M 1/274 |
| 2018/0198740 A1* | 7/2018 | Rademacher | H04L 51/04 |
| 2019/0253516 A1* | 8/2019 | Sodaitis | G06Q 50/01 |
| 2019/0288968 A1* | 9/2019 | Chilakamarri | H04L 65/403 |
| 2020/0034914 A1* | 1/2020 | Boss | G06Q 30/0633 |
| 2020/0151358 A1* | 5/2020 | Czajka | H04L 67/12 |
| 2020/0396266 A1* | 12/2020 | Goel | H04L 67/306 |
| 2021/0312396 A1* | 10/2021 | Mueller | H04L 9/0872 |
| 2021/0359186 A1* | 11/2021 | Chadda | H01L 33/46 |

* cited by examiner

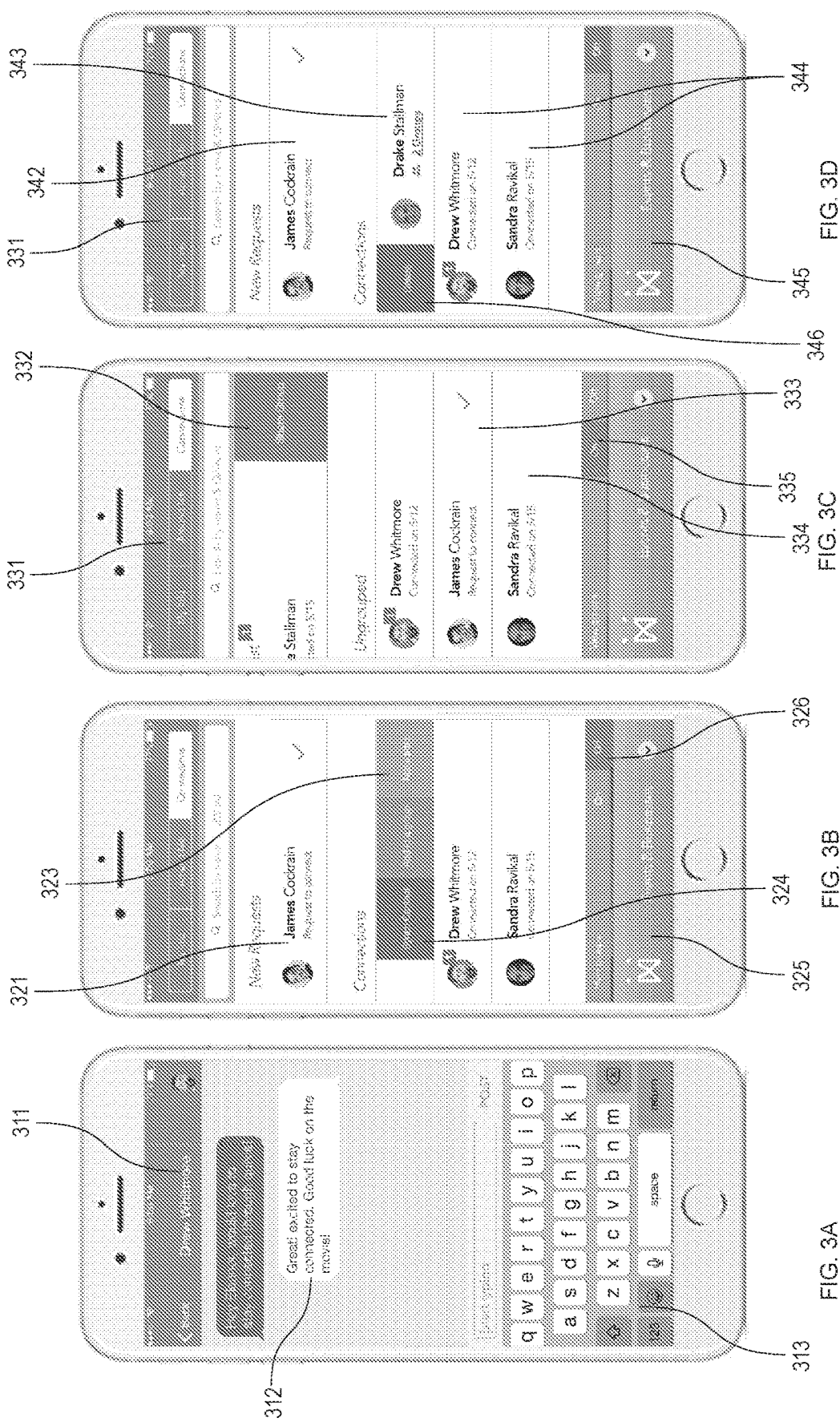

SYSTEMS AND METHODS FOR ORGANIZING AND SHARING CONTACT AND CALENDAR INFORMATION

CROSS-REFERENCE TO RELATED APPLICATIONS

This application is the U.S. National Phase under 35 U.S.C. § 371 of International Application No. PCT/US2019/044735, filed Aug. 1, 2019, entitled SYSTEMS AND METHODS FOR ORGANIZING AND SHARING CONTACT AND CALENDAR INFORMATION, which claims the benefit of priority under 35 U.S.C. § 119 (e) to U.S. Provisional Application No. 62/714,592, filed on Aug. 3, 2018, entitled "SYSTEMS AND METHODS FOR ORGANIZING AND SHARING CONTACT AND CALENDAR INFORMATION," which is are hereby incorporated by reference herein in their entireties.

BACKGROUND

Technical Field

This disclosure is generally related to improved computer-implemented systems and methods for organizing and sharing contact and calendar information.

Description of Related Art

There are many different technological means for communicating, such as telephone, email, and instant messaging. Service providers may offer one or more of these communication options to communicators through hardware and software. Modern cellphones and computers, combined with applications which may be factory, distributer, retailer, or user installed, are common technologies to enable these forms of communication.

SUMMARY

It is common for digital communicators to want different levels of communicative connection to their contacts. While in some cases a communicator may wish to provide a contact with an email address, phone number, and instant messaging connection, this may not always be the case. Instead, the communicator may want to provide one contact with access to instant messaging only, while providing complete contact information to another contact.

Some embodiments provide a system or method to facilitate controlling the contact information provided to new and existing contacts. When a first user wants to add a new contact, the first user has various options for providing contact information to the new contact. Some embodiments provide a system or method to facilitate controlling which contacts receive updated contact information from the first user when the first user updates their contact information. Some embodiments provide a system or method to facilitate connecting with contacts using a variety of connection modes. The system can have a method or system for switching between these different connection modes.

Some embodiments may allow the user to control how much access the application provider and application server have to the user data. In some embodiment the data may be encrypted and stored on a blockchain such that the application provider and application server does not have access to user data or to the data of the contacts connected to the user.

This disclosure describes example systems and methods for facilitating a user to control what information and communication methods are available for use by the user's contacts. It also describes systems and methods for controlling how the user connects with new contacts. It also describes example systems and methods for using a blockchain to store user and contact data.

BRIEF DESCRIPTION OF THE DRAWINGS

FIG. 3A is a diagram of an example user interface for communicating via text messages.

FIG. 3B is a diagram of an example user interface for performing actions related to contacts, such as introducing contacts to each other.

FIG. 3C is a diagram of an example user interface for performing actions related to groups, such as adding contacts to groups, or sharing groups.

FIG. 3D is an example user interface for performing actions related to contacts, such as deleting contacts.

DETAILED DESCRIPTION OF PREFERRED EMBODIMENTS

Figure 1:
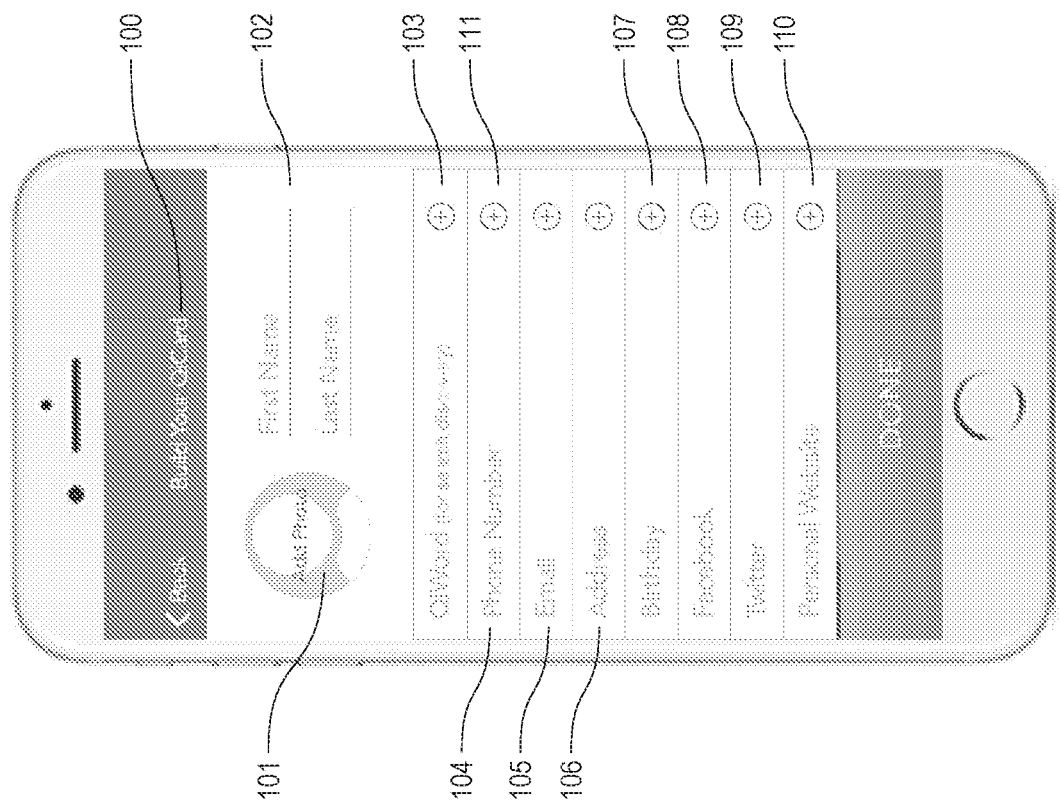
FIG. 1 is a diagram of an example user interface for building a profile.

Example embodiments described herein have several features, no single one of which is indispensable or solely responsible for their desirable attributes. Without limiting the scope of the claims, some of the advantageous features of some embodiments will be described.

Some embodiments provide a system for signup where the user selects a username and password 405. The system then prompts the user to indicate whether the user is a business or not 410. If the user is a business they can choose to be found in a business directory 415. In some embodiments the business directory can be searched by other users. As a member of the business directory non-contacts may be able to find the user by searching. In some embodiments the business directory data may be stored on a blockchain.

In some embodiments both business users and non-business users may be able to create a contact card 810. The data shared using the contact card can be customized on a user-by-user basis 815. For example, in some embodiments a first user may choose to share only their email address with a second user, but may choose to share both their phone number and their email address with a third user. Data fields shared on the contact card may include a keyword unique to the user account, a name, a photo, addresses, email addresses, phone numbers, links to social media, other links, birthdates, other dates, and other data 805. In some embodiments the data fields filled by the user may be stored locally on the user device, on a server, or on a blockchain. In some embodiments the data stored on the blockchain may be encrypted and may be unavailable to the contact management application providers.

In some embodiments there are multiple ways for users to connect 710, 720, 730, 740. All the connection methods require that the propositioned user accept the invitation to be added as a contact by the requesting user 754.

In some embodiments one method to connect may be called Geo 710. In this mode users share their location 712 with other users, and they receive notification of other users nearby 714. In some embodiments this mode may use Bluetooth or another suitable system to create a peer-to-peer WiFi connection between nearby devices running the contact management application in Geo mode. In some embodiments users with Geo mode enabled are able to request to connect with other nearby users using Geo mode. Similarly users in Geo mode can be propositioned to connect by other users in Geo mode. In some embodiments when a connection is formed using Geo mode the time and place of the connection are stored. In some embodiments the data storage occurs on a blockchain, a server, or on the device. In some embodiments the data stored on the blockchain may be encrypted and may be unavailable to the contact management application providers. In some embodiments, a user can share its location via Geo mode to a select group of other users with it is already connected. For example, a plurality of users may each be at a large public event (e.g., a festival or tradeshow). By sharing their location via Geo mode, each user of the plurality of users may be able to quickly and easily navigate to a position of one or more of the plurality of users to find each other. Additionally or alternatively, this data may be encrypted using blockchain.

In some embodiments users may connect using a keyword 720. The keyword 720 may be referred to as a "Qiword" or another identifier. The keyword is created by a first user, and is unique to the creator's user account 722. The keyword can be entered by other users into a keyword bar to find the first user associated with the keyword and to enable to option to request a connection with the first user 724, 726, 750. In some embodiments users cannot be found by searching using their name, email, or other data unless they have enabled being found in this manner. In some embodiments the keyword is stored on a blockchain, or on a server. In some embodiments the data stored on the blockchain may be encrypted and may be unavailable to the contact management application providers. In some embodiments, the first user can import contacts from an existing address book (e.g., in a first client system). For example, the user may search and/or locate other users through the contact information (e.g., email, phone number, etc.) for users that have enabled a corresponding client system to access their contact information.

In some embodiments another method for users to connect may be E-troduction 730. E-troduction enables a first user, who has a second and third user as contacts, to suggest that the second and third users become contacts with each other 732, 734, 736. Additionally or alternatively, the first user may utilize an "E-troduce" feature on a client system to connect two (or more) individuals who are not currently on a client system? The system may provide contact information for the two individuals based on contact information received. For example, a user may have contact information for other individuals through an existing address book. Contact information or these individuals may be imported into the client system, which may then send invitational links for the individuals to connect with each other via corresponding client systems. This feature may be used to create one or more groups of users (e.g., based on whether the individuals were introduced via the E-troduce functionality).

In some embodiments it is possible to add a contact by sharing a user's contact card 742. This is accomplished by sending a direct link 740. Users who follow the link may become contacts with the first user. Non-users who follow the link are prompted to join the service and become users 745, 747. If the non-users choose not to become users they are still able to view the contact information shared on the contact card 749.

In some embodiments when requesting to become a contact with another user, the requesting user's connection profile can be seen by the requested user 752. The connection profile can be customized by the first user. Once a connection is formed the information shared with the contact can be expanded past the initially shared information in the connection profile. The information associated with the connection profile may be stored on a blockchain, or on a server. In some embodiments the data stored on the blockchain may be encrypted and may be unavailable to the contact management application providers.

In some embodiments users may create alias connection profiles each time they request to connect. These alias profiles may obtain separate keywords 720.

In some embodiments when a new user joins the contact management application the user is prompted to send invitations to all of the users contacts in an existing computerized address book. These invitations may include an invitation to join the contact management application and an invitation to add the user as a contact. The user may customize the list to send invitations to a subset of their contacts. The invitations can be customized with a custom connection profile and with varying levels of access to contact fields 515.

In some embodiments the application users are limited to communicating with a contact by the communication means shared by that contact 540. For example if a user's contact has only enabled communication via messaging through the contact management application, then this is the only means of communication available for use by the first user with that contact. If that contact later decides to reveal their telephone number to the user, then the user can utilize the telephone number to communicate with the contact 555.

In some embodiments when a first user updates their contact information they are prompted to send that update to their contacts 605. The user can customize which contacts will receive the update, and may customize the content of the update sent to each of their contacts by editing the contact fields that will be updated 610. The use of groups may facilitate this process. When a second user receives an update from a first user they have the option to accept the update, or any part of it and update their address book 625. If enabled, this acceptance may also update other address books on the second user's device. In some embodiments the contact information fields may be stored on a blockchain, on a server, and/or on a user's device. In some embodiments the data stored on the blockchain may be encrypted and may be unavailable to the contact management application providers.

The contact management application may be integrated with the user's device such that the user can initiate calls, texts and emails directly from the contact management application, they can also update address book information stored on their device with the information in the contact management application. In some embodiments this updating process may be automatic.

After a new connection is formed, the contact management application may store information about the creation of the connection 756. This information may be stored on a blockchain, on a server and/or on a user device. In some embodiments the data stored on the blockchain may be encrypted and may be unavailable to the contact management application providers. If geo mode was enabled the contact management application may store the location where the connection was formed. The time of connection may also be stored. Furthermore, the method of connection; geo, keyword, direct link, referral, or other method may be stored.

In some embodiments the contact management application enables the creation of groups. Contacts can be sorted into groups. A contact could be part of many groups. Updates to contact information could be customized on a group level. For example, a user may have a group called family and another group called friends. The user may update their contact information with a new email and a new phone number and customize the update such that family receives and update to both email and phone number, but the friends group only receives an updated phone number. If a user is part of multiple groups the user may be able to decide how users who are part of multiple groups are updated. Group membership data may be stored on a blockchain, on a server, and/or on a user's device. In some embodiments the data stored on the blockchain may be encrypted and may be unavailable to the contact management application providers.

Users can author and comment on posts privately with groups.

Users may also create and update events via the contact management application. Non-users who are invited to the event can access it and make changes using a direct link to the event. Event data may be stored on a blockchain, on a server, and/or on a user's device. In some embodiments the data stored on the blockchain may be encrypted and may be unavailable to the contact management application providers.

Users can create a calendar of events on the app and share their calendar with one or more second users. Second users who have received a shared calendar can view the events the first user has scheduled. The second user can turn on and off the visibility of the first user's calendar events. The calendar data may be stored on a blockchain, on a server, and/or on a user's device. In some embodiments the data stored on the blockchain may be encrypted and may be unavailable to the contact management application providers.

In some embodiments users may share their location with all or some of their contacts. Other information may additionally or alternatively be shared with one or more contacts. For example, a user can create a "Sharing Platform" for sharing media files (e.g., photos, video, audio) and/or text conversations. The Sharing Platform may be accessible by each user who has access to the Sharing Platform (e.g., through invitation as described herein) via a corresponding client device. The shared files on the Sharing Platform may be encrypted using blockchain.

In some embodiments users may purchase gift cards and other products within the platform and may send these purchases to users and non-users.

In some embodiments the contact management application may use a blockchain to store user information and as a security mechanism. In other embodiment the system may utilize encryption and other security methods to protect user data. In some embodiments data storage may be accomplished using blockchain, or by any other suitable means.

The system can include a user interface. FIG. 1 illustrates an embodiment of the user interface 100 that enables a user to enter their personal information into a contact card. In some embodiments the contact card allows the user to add a photo 101, a name 102. In some embodiments the system may also allow a user to add one or more keywords 103, phone numbers 104, emails 105, addresses 106, birthdays 107, Facebook accounts 108, Twitter accounts 109, and other personal websites 110. Keywords (which can be called "Qiwords" or another identifier) are user-selected terms which can be provided to second users to enable those second users to find and add the first user as a contact. Those second users enter the keyword into a search bar 234 to search for the first user. In some embodiments the user can add a field by clicking on the plus 111 to add a field that has not yet been added. To edit a field that has already been added the user clicks on the field.

Figures 2A, 2B, 2C, 2D:
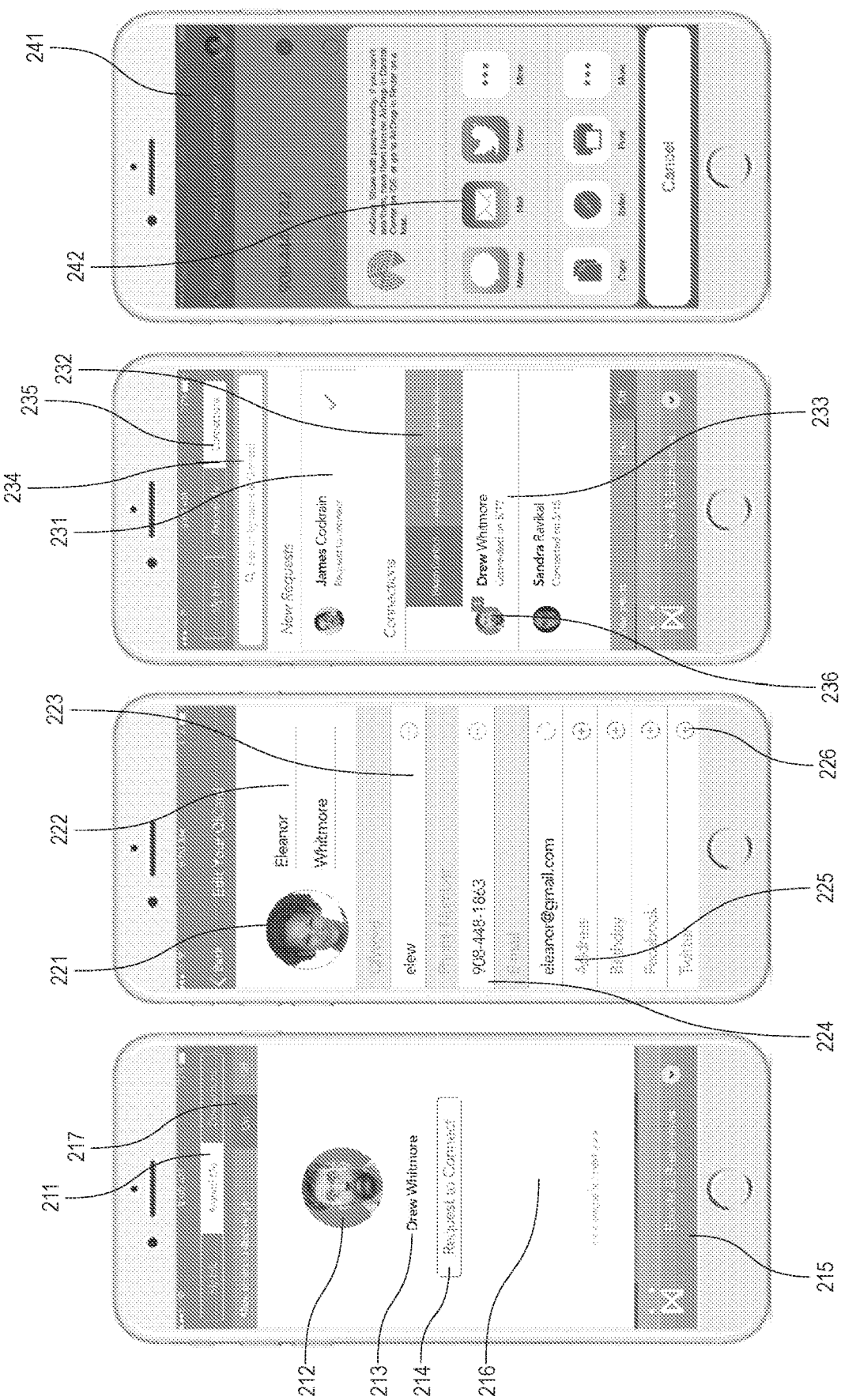
FIG. 2A is a diagram of an example user interface for sending a connection request to a nearby user.
FIG. 2B is a diagram of an example user interface for editing a user profile.
FIG. 2C is a diagram of an example user interface for performing actions related to contacts, such as updating contact information or adding a contact to a group.
FIG. 2D is a diagram of an example user interface for sharing contact information.
Figure 4:
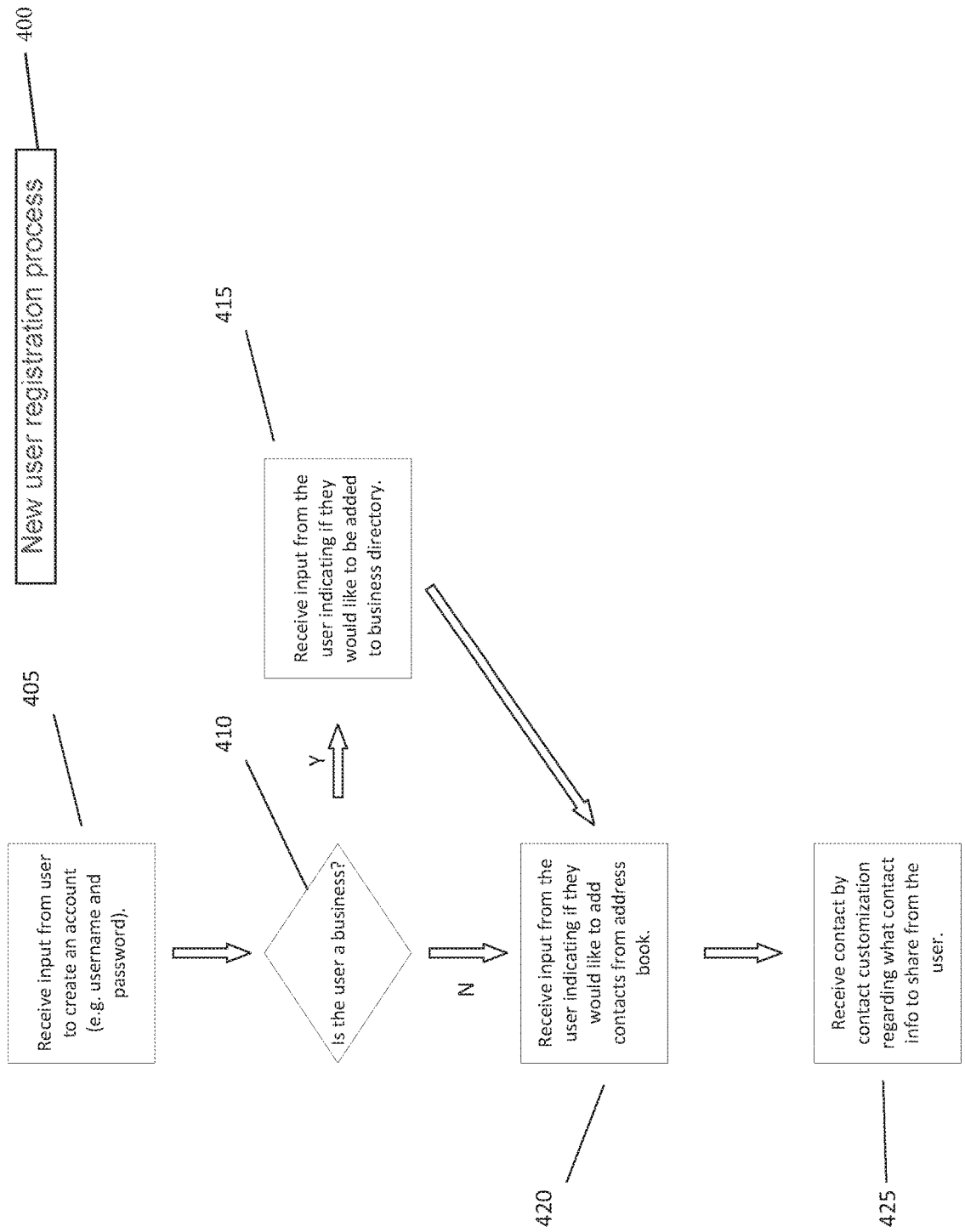
FIG. 4 is a flowchart for an example contact management application sign-up process.
Figure 5:
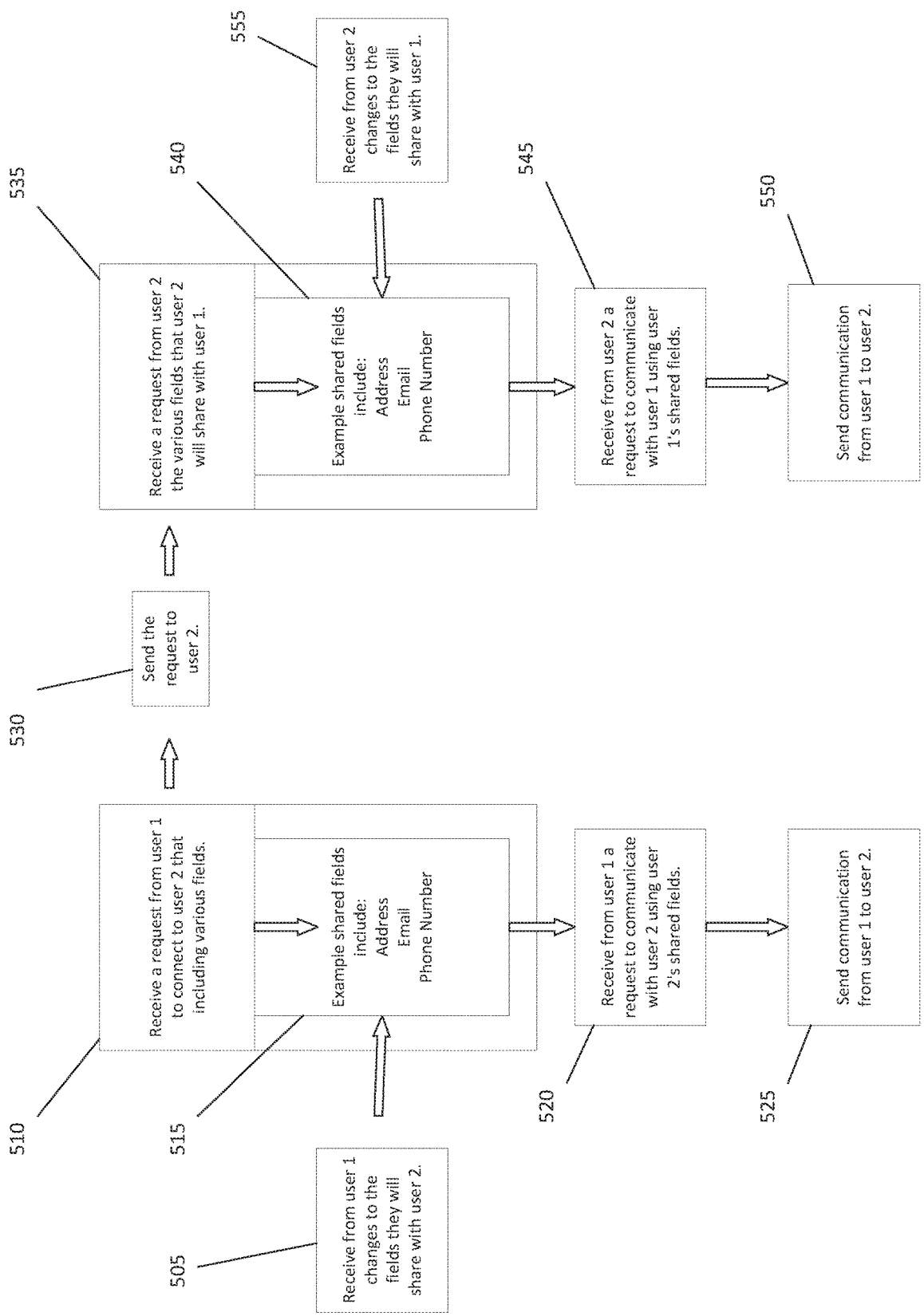
FIG. 5 is a flowchart for an example contact management application showing how a user can select the field they would like to share with their connections, at the time of contact creation, and afterwards.

In some embodiments the system can include a user interface. FIG. 2A, shows one embodiment of the user interface for the geo functionality. This function corresponds to geo mode selection 710. In some embodiments the user navigates to this screen of the contact management application by providing an input, such as a touch, to the button 211. Then, in some embodiments the user is prompted to turn on discovery by others by selecting button 217. Once activated the user is able to see other people using the contact management application who are nearby. In some embodiments the picture of another user 212 is shown in a circle in the approximate middle of the screen. The name 213 of the user may be shown below the picture. In some embodiments, a button 214 may be located in the center of the screen. When clicked, this button may initiate the sending of a connection request 750 from the first user to the second user. The first user can swipe 216 the screen to search through the other nearby contact management application users.

FIG. 2B shows one embodiment of the user interface for editing the user's contact information. The users profile picture 221 may be shown inside a circle. The user's name 222 may be shown beside the profile picture. The keyword 223, phone number 224, email 225 and other contact information are also displayed. The user can edit the fields by selecting the field they would like to change and then applying the change they desire. To add a field that has not yet been added the user may click the plus 226. Once pushed the field can be edited by the user. Once the user makes a change the system may push the customizable update to the users contacts according to FIG. 6.

FIG. 2C shows one embodiment of the user interface for adding new contacts. In some embodiments the user is able to navigate to the screen by selecting the button 235. The screen can display requests to connect 231 in the upper portion of the screen. The bottom may display existing connections 233. In some embodiments, if a message or other notification associated with a contact has not yet been viewed by the user a number 236 will appear along with the contact's picture indicating the number of such messages. In some embodiments the user may use the middle menu 232 to enable making an E-troduction 730 between contacts.

FIG. 2D shows one embodiment of the user interface for sending contact information. In some embodiments the user is able to enter a screen 241 to send contact information through a variety of means 242 including email, twitter, instant messaging and or other means.

FIG. 3A shows an embodiment of the user interface for sending messages within the contact management application. At the top of the screen the contact's name 311 or the conversation participants may appear. The central part of the screen 312 may be used to display the messages sent by the participants in the conversation. The bottom of the screen may be used to display a touchpad keyboard 313.

Figure 6:
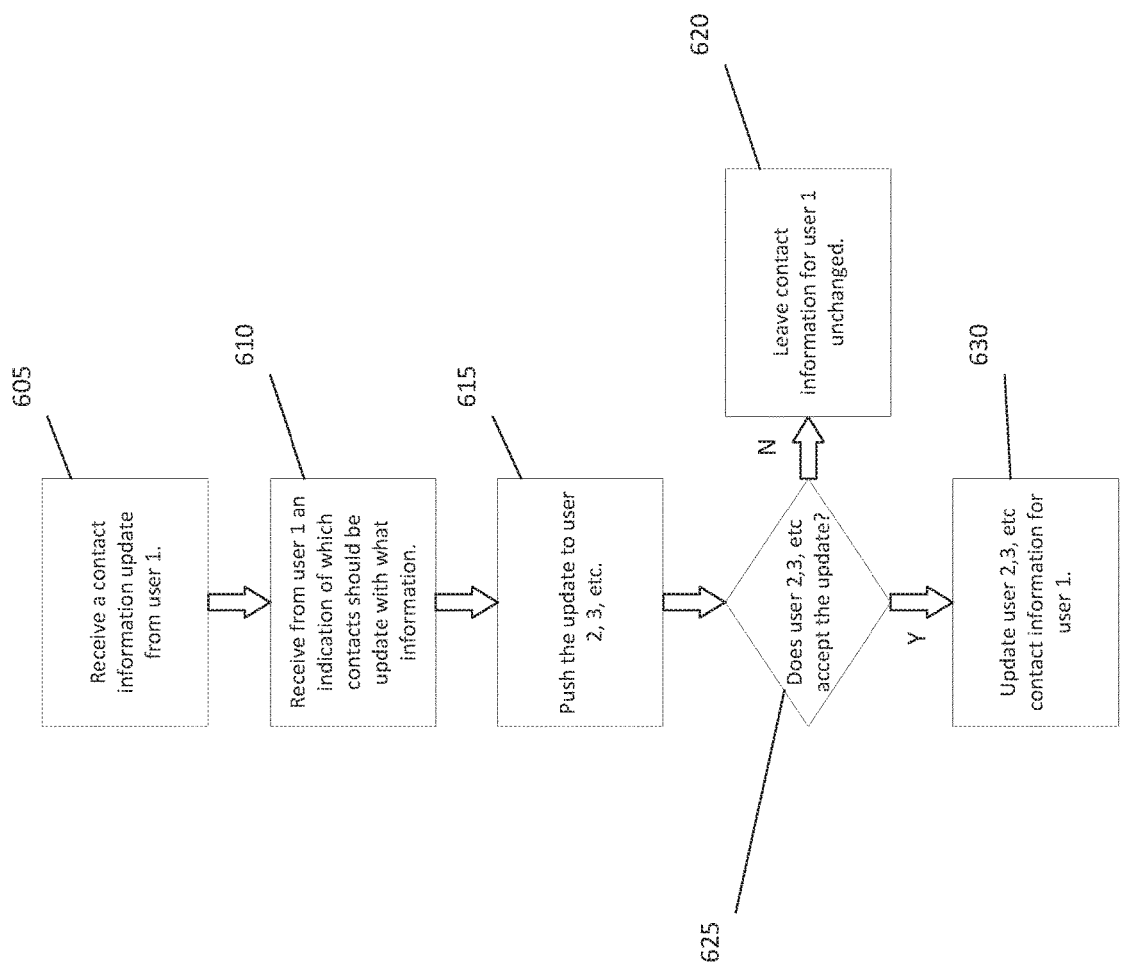
FIG. 6 is a flowchart for an example contact management application showing how contact information updates are pushed to contacts who have the option to accept or reject the update.
Figure 7:
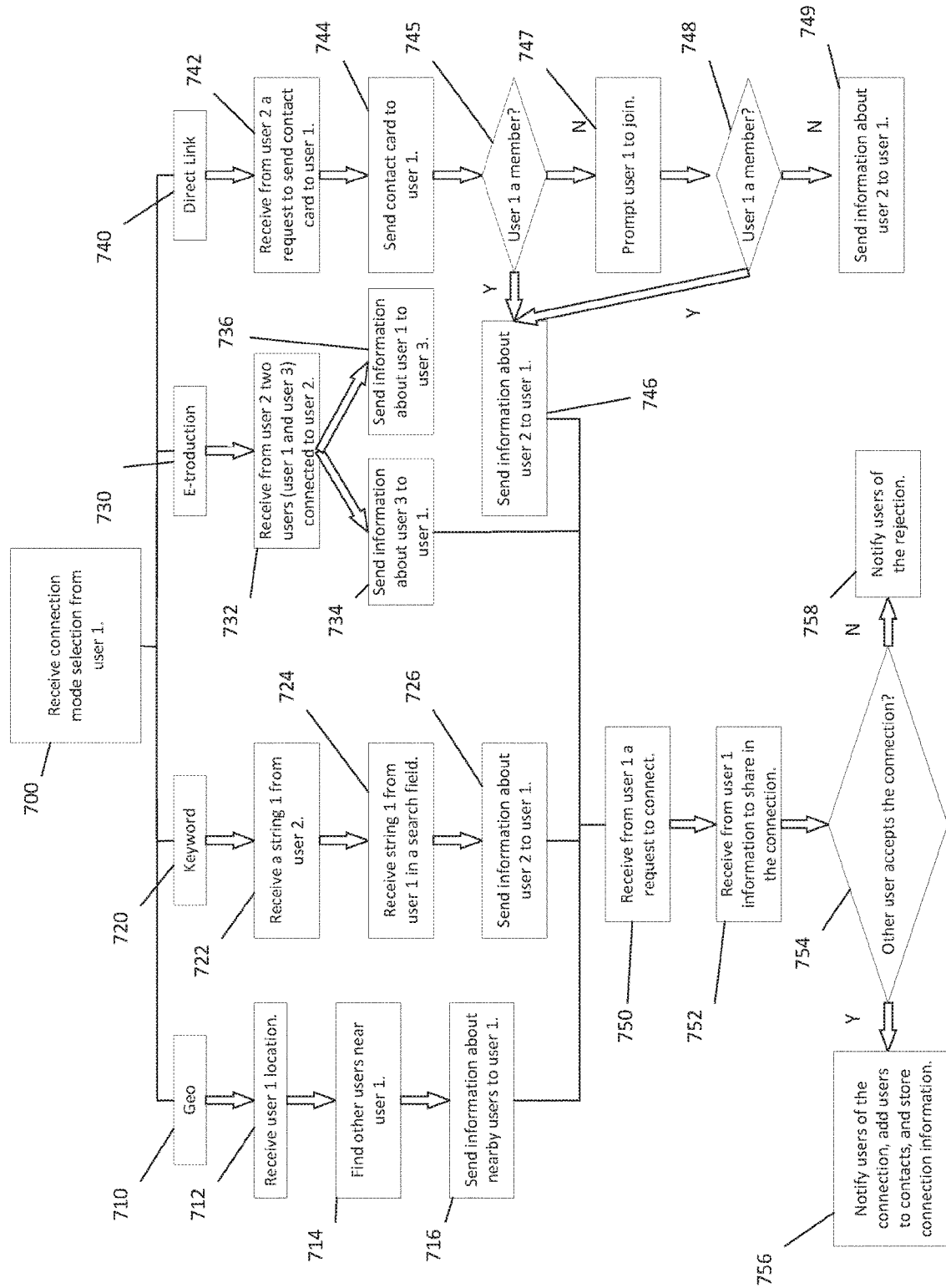
FIG. 7 is a flowchart for an example contact management application showing how users are able to connect to each other using a variety of methods.
Figure 8:
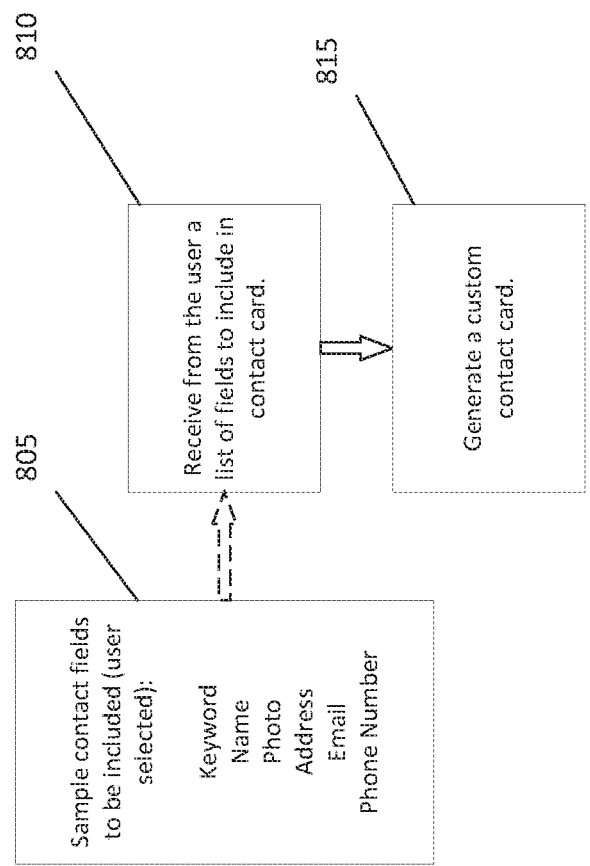
FIG. 8 is a flowchart for an example contact management application showing how the user creates a contact card that they are able to share with other users.

FIG. 3B shows an embodiment of the user interface for providing contacts with updated contact information. Contacts are synced by using the button 324. The syncing process is shown in FIG. 6.

FIG. 3C shows an embodiment of the user interface for managing groups within the contact management application. In some embodiments the user navigates to this screen by selecting connections from the top bar 331, and then by activating view groups by selecting button 335. In some embodiments the button 332 allows a user to share groups they are connected to with other users. In some embodiments the bottom of the screen is used to display contacts that have not been added to any group.

FIG. 3D shows an embodiment of the user interface for deleting connections. In some embodiments the user navigates to this screen by selecting connections from the top bar 331. In some embodiments the user can swipe a contact 343 to the right or the left, or perform some other action to reveal a delete button 346. In some embodiments the picture and text associated with the contact move when the user performs the action to reveal the delete button. In some embodiments when the user clicks on the delete button 346 the user is able to then delete the contact from their list of contacts.

Figure 9:
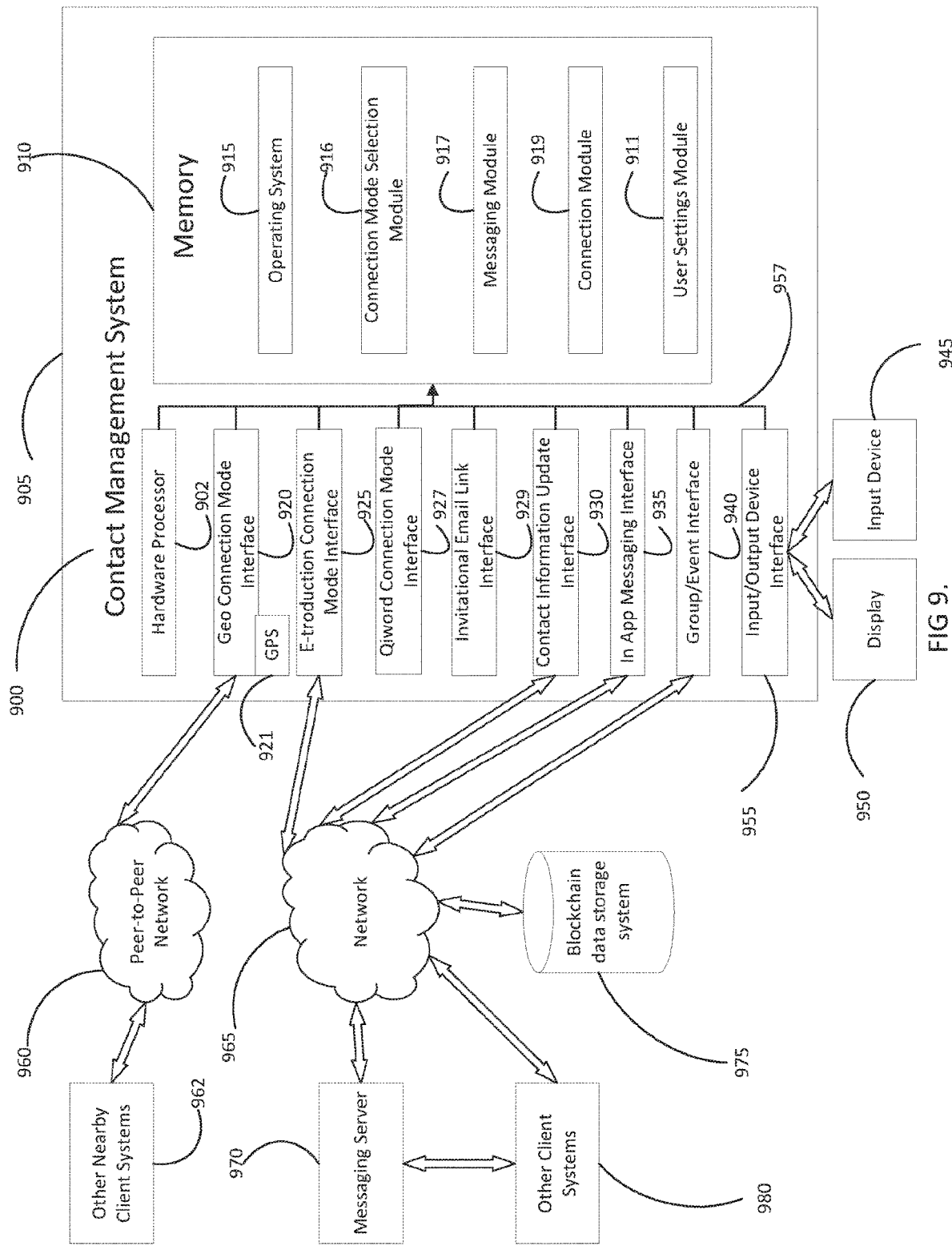
FIG. 9 is a system diagram of an example contact management system.

FIG. 9 is an example system diagram of a contact management system. As depicted in figure, the multi-mode contact management system 900 can include a contact management system 905. The architecture of the contact management computing system 905 can include an arrangement of computer hardware and software components used to implement aspects of the present disclosure. The contact management system 905 may include more or fewer elements than those shown in FIG. 9. It is not necessary, however, that all of these elements be shown in order to provide an enabling disclosure. In some embodiments, the contact management computing system 905 is an example of what is referred to hereinbefore as a contact management application.

As illustrated, the contact management computing system 905 can include a hardware processor 902, a memory 910, a geo connection mode system 920, a E-troduction connection mode system 925, a keyword connection mode system 927, an invitational email connection mode system 929, a contact information update system 930, an in-app messaging system 935, a group/event system 940, and/or an input/output device interface 955, all of which can communicate with one another by way of a communication bus 957 or any other data communications technique. The hardware processor 902 can read and write to the memory 910 and can provide output information for the display 950 via the input/output device interface 955. The example graphical user interface shown in FIGS. 1, 2A, 2B, 2C, 2D, 3A, 3B, 3C, and 3D and/or other screen views can be presented on the display 950. The input/output device interface 955 can also accept input from an input device 945, such as a keyboard, mouse, digital pen, microphone, touch screen, gesture recognition system, voice recognition system, and/or another input device capable of receiving user input. In some embodiments, the display 950 and the input device 945 can have the same form factor and share some resources, such as in a touch screen-enabled display.

In some embodiments, the geo connection mode system 920, can be connected to other nearby client systems 962 via one or more peer-to-peer networks 960. In other embodiments the geo connection mode system 920 can be connected to other client systems via one or more networks 965 (such as the Internet, 3G/Wi-Fi/LTE/5G networks, satellite networks, etc.).

In some embodiments the E-troduction connection mode system 925, the keyword connection mode system 927, the invitational email connection mode system 929, the contact information update system 930, the in-app messaging system 935, and the group/event system 940 can be connected to a messaging server 970, other client systems 980 and a blockchain data storage system 975 via one or more networks 965 (such as the Internet, 3G/Wi-Fi/LTE/5G networks, satellite networks, etc.).

In some embodiments, the geo connection mode system 920 can include a geopositioning sensor 921. The geo connection mode system 920 can receive geopositioning information from a satellite-linked navigation system and/or the network 965, and/or the network 960. In some embodiments, the geo connection mode system may receive, where applicable, alternate position information or information that can be used for location determination (such as a cellular and/or Wi-Fi signal that can be used to triangulate a location). In some embodiments, the geo connection mode system 920 can receive location data from other nearby client systems 962.

In some embodiments the E-troduction interface 925 can receive contact information from the blockchain storage system via the network 965. The E-troduction interface 925 can submit contact information to the blockchain storage system 975 and/or other data storage systems via the network 965. The information submitted to and retrieved from the blockchain storage system 975 may include contact connections, contact information, etc.

In some embodiments the keyword interface 927 can receive contact information from the blockchain storage system 975 via the network 965. The keyword interface 927 can submit contact information to the blockchain storage system and/or other data storage systems via the network 965. The information submitted to and retrieved from the blockchain storage system 975 may include contact connections, contact information, etc.

In some embodiments the invitational email link interface 929 can send contact information to other client systems 980 via the network 965. The invitational email link interface 929 can submit contact information to the blockchain storage system and/or other data storage systems via the network 965. The information submitted to and retrieved from the blockchain storage system 975 may include contact connections, contact information, etc.

In some embodiments the contact information update interface 930 can send and/or receive updates from the blockchain data storage system 975 and/or other client systems 980 via the network 965. The contact information may in some embodiments include email, telephone number, name, other personal websites, Facebook account information, Twitter account information, other social media account information, and other information. In other embodiments the contact information update interface 930 can send and/or receive contact information and lists of contacts from the blockchain data storage system 975, other data storage systems, and/or other client systems 980 via the network 965. The contact information may in some embodiments include email, telephone number, name, other personal websites, Facebook account information, Twitter account information, other social media, and other information. The lists of contacts may include which users are connected to the user via the contact management application.

In some embodiments the in app messaging interface 935 can send and/or receive information from the messaging server 970 and/or other client systems 980 via the network 965. The information may in some embodiments include messages sent from a first user to a second user whom the first user is connected to as a contact via the contact management system.

In some embodiments the group/event interface 940 can receive group and event information to other client systems 980 via the network 965. The group/event interface 940 can submit contact information to the blockchain storage system and/or other data storage systems via the network 965. The information submitted to and retrieved from the blockchain storage system 975 and/or other data storage systems may include membership in groups, messages associated with groups, group names, event invitees, event organizers, event messages, other information associated with groups, other information associated with events.

The memory 910 can contain computer program instructions (grouped as modules or components in some embodiments) that the hardware processor 902 can execute in order to implement one or more embodiments described herein. The memory 910 can generally include RAM, ROM and/or other persistent, auxiliary or non-transitory computer-readable media. The memory 910 can store an operating system 515 that provides computer program instructions for use by the hardware processor 902 in the general administration and operation of the contact management computing system 905.

In some embodiments the memory 910 can include computer program instructions and other information for implementing aspects of the present disclosure including a mode selection module 916, a messaging module 917, a group/event module 918, and a connection module 919, a user settings module 911, other modules, and/or any combination of modules.

In some embodiments, the memory 910 may include the connection mode selection module 916 that the hardware processor 902 executes. The connection mode selection module 916 enables generation of lists of potential contacts, enables requesting a new contact, and enables searching for new contacts through a variety of means including in some embodiments the geo, E-troduction, keyword, invitational email link, and other methods for connecting to new contacts.

In some embodiments, the memory 910 includes a messaging module 917 that the hardware processor 504 executes in order to send messages from the contact management computing system to other client systems 980. These messages can be stored on the blockchain data storage system 975, on the messaging server 970 and/or other data storage systems.

In some embodiments, the memory 910 includes a user settings module 911. The user settings module 911 can provide access to various user settings related to user preferences, including the visual appearance of the user interface. For example, the size of contact pictures and font sizes. The user settings module may store these preference on the blockchain data storage system 975, and/or other data storage systems.

In some embodiments the memory 910 includes a connection module 919. The connection module can provide contact information to the various interface systems. The connection modules sends and/or receives information related to new and/or existing contacts from the blockchain data storage system 975 and/or other data storage systems via the network 965. The contact information may in some embodiments include email, telephone number, name, other personal websites, Facebook account information, Twitter account information, other social media, and other information.

In some embodiments, the system 905 can be a software application configured to execute on a general-purpose or special-purpose computing device, such as, for example, a smartphone, a tablet computer, a laptop computer, or another computing device.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Language of example or capability used herein, such as, among others, "can," "could," "might," "may," "e.g.," "some," "certain," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown and described features as applied to various example embodiments, omissions, substitutions, additions, and changes in the form and details of the devices or algorithms described can be made without departing from the spirit of the disclosure. Certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A non-transitory computer-readable medium comprising program instructions for generating a sharable content item and enabling asymmetrical information sharing from the content item, wherein execution of the program instructions by a hardware processor directs the hardware processor to:
   receive a contact request from a first client system associated with a first user, the contact request comprising an indication of contact information fields the first user will share, a connection profile of the first user, the connection profile comprising information selected by the first user;
   identify, in response to the contact request, a geographic location associated with the first user;
   receive from the first user a selection of a discovery mode configured to allow the first user be discovered by users in proximity to the first client system;
   transmit a request to a blockchain to obtain a keyword comprising of non-contact information, the keyword unique to and selected by a second user;
   receive the keyword from the blockchain;
   determine an identification of the second user based on the keyword and on a proximity between the geographic location associated with the first user and a geographic location associated with the second user;
   automatically generate data for displaying to the first user a visual representation associated with the second user in response to determining the identification of the second user;
   receive from the first user a selection of a first transmission command;
   send, based on the selection of the first transmission command, the contact request to a second client system associated with the second user while the geographic location associated with the first user is within a threshold distance from the geographic location associated with the second user;
   receive from the second client system an indication of the contact information fields that the second user will share with the first user;
   generate a contact for the first user, where the contact contains the shared contact information fields as indicated by the second user;
   generate a contact for the second user, where the contact contains the shared contact information fields as indicated by the first user;

receive, via the first client system, user command to obtain a gift card value;

receive a second transmission command and of an indicator associated with the second user; and in response to the second transmission command and based on the indicator associated with second user, transmit a gift card value from the first client system to the second system.

2. The non-transitory computer-readable medium of claim 1, wherein execution of the program instructions by the hardware processor directs the hardware processor to access at least the contact information fields and connection profile from the blockchain.

3. The non-transitory computer-readable medium of claim 1, wherein execution of the program instructions by the hardware processor directs the hardware processor to store a time, location, and method of connection of the first user at the time of creating a contact entry for the second user.

4. The non-transitory computer-readable medium of claim 3, wherein execution of the program instructions by the hardware processor directs the hardware processor to store the time, location and method of connection of the second user at the time of creating a contact entry for the first user.

5. The non-transitory computer-readable medium of claim 1, wherein execution of the program instructions by the hardware processor directs the hardware processor to:

identify first and second new client systems associated with respective first and second new users;

send a first invitational link to the first new client system, the first invitational link configured, in response to a user selection thereof, to generate a new contact for the first new user, wherein the new contact contains shared contact information fields as indicated by the second new user; and send a second invitational link to the second new client system, the second invitational link configured, in response to a user selection thereof, to generate a new contact for the second new user, wherein the new contact contains shared contact information fields as indicated by the first new user.

6. The non-transitory computer-readable medium of claim 5, wherein execution of the program instructions by the hardware processor directs the hardware processor to:

generate a group indicator on one or more of the first and second new client systems, the group indicator identifying the first and second new users as part of a common group.

7. The non-transitory computer-readable medium of claim 1, wherein execution of the program instructions by the hardware processor directs the hardware processor to:

identify a location of the first client system via a global positioning system (GPS) associated with the client system;

identify a location of a location-based client system associated with a first location-based user, the first location-based client system identified via a global GPS associated with the first location-based client system;

in response to a user selection, send a first location indicator associated with the location of the first client system to the location-based client system; and in response to a user selection, send a second location indicator associated with the location of the first location-based client system to the first client system.

8. The non-transitory computer-readable medium of claim 7, wherein execution of the program instructions by the hardware processor directs the hardware processor to access at least the location of the first client system and location-based client system from the blockchain.

9. The non-transitory computer-readable medium of claim 1, wherein execution of the program instructions by the hardware processor directs the hardware processor to:

receive a media request from the first client system associated with the first user, the media request comprising an indication of media information the first user will share, the media information comprising information selected by the first user;

send the media request to a second client system associated with a second user; and receive from the second client system an indication of media information that the second user will share with the first user.

10. The non-transitory computer-readable medium of claim 9, wherein execution of the program instructions by the hardware processor directs the hardware processor to:

in response to the sending of the media request to the second client system, send an indication of successful delivery to the second client system; and in response to the receiving of the media request from the second client system, receive an indication of successful delivery from the second client system.

11. The non-transitory computer-readable medium of claim 10, wherein the media information comprises one or more of a photo file, a video file, an audio file, or an indication of a text conversation.

12. The non-transitory computer-readable medium of claim 11, wherein execution of the program instructions by the hardware processor directs the hardware processor to access at least the media information of one or both of the first or second client systems from the blockchain.

13. The non-transitory computer-readable medium of claim 1, wherein execution of the program instructions by the hardware processor further directs the hardware processor to:

receive a second keyword associated with the second user;

receive user selection of the second keyword associated with the second user; and send to the second client system, based on the second keyword, a request to exchange contacts.

14. The non-transitory computer-readable medium of claim 13, wherein execution of the program instructions by the hardware processor further directs the hardware processor to:

send to the second client system identifying information associated with the first user, the identifying information comprising the first keyword.

15. A non-transitory computer-readable medium comprising program instructions for generating a sharable content item and enabling asymmetrical information sharing from the content item, wherein execution of the program instructions by a hardware processor directs the hardware processor to:

receive a contact request from a first client system associated with a first user, the contact request comprising an indication of contact information fields the first user will share, a connection profile of the first user, the connection profile comprising information selected by the first user;

identify, in response to the contact request, a geographic location associated with the first user;

receive from the first user a selection of a discovery mode configured to allow the first user be discovered by users in proximity to the first client system;

transmit a request to a blockchain to obtain a keyword comprising of non-contact information, the keyword unique to and selected by a second user;
receive the keyword from the blockchain;
determine an identification of the second user based on the keyword and on a proximity between the geographic location associated with the first user and a geographic location associated with the second user;
automatically generate data for displaying to the first user a visual representation associated with the second user in response to determining the identification of the second user;
receive from the first user a selection of a first transmission command;
send, based on the selection of the first transmission command, the contact request to a second client system associated with the second user while the geographic location associated with the first user is within a threshold distance from the geographic location associated with the second user;
receive from the second client system an indication of the contact information fields that the second user will share with the first user;
generate a contact for the first user, where the contact contains the shared contact information fields as indicated by the second user; and
generate a contact for the second user, where the contact contains the shared contact information fields as indicated by the first user.

16. A non-transitory computer-readable medium comprising program instructions for generating a sharable content item and enabling asymmetrical information sharing from the content item, wherein execution of the program instructions by a hardware processor directs the hardware processor to:
receive a contact request from a first client system associated with a first user, the contact request comprising an indication of contact information fields the first user will share, a connection profile of the first user, the connection profile comprising information selected by the first user;
identify, in response to the contact request, a geographic location associated with the first user;
receive from the first user a selection of a discovery mode configured to allow the first user be discovered by users in proximity to the first client system;
transmit a request to obtain a keyword comprising of non-contact information, the keyword unique to and selected by a second user;
receive the keyword;
determine an identification of the second user based on the keyword and on a proximity between the geographic location associated with the first user and a geographic location associated with the second user;
automatically generate data for displaying to the first user a visual representation associated with the second user in response to determining the identification of the second user;
receive from the first user a selection of a first transmission command;
send, based on the selection of the first transmission command, the contact request to a second client system associated with the second user while the geographic location associated with the first user is within a threshold distance from the geographic location associated with the second user;
receive from the second client system an indication of the contact information fields that the second user will share with the first user;
generate a contact for the first user, where the contact contains the shared contact information fields as indicated by the second user;
generate a contact for the second user, where the contact contains the shared contact information fields as indicated by the first user;
receive, via the first client system, user command to obtain a gift card value;
receive a second transmission command and of an indicator associated with the second user; and
in response to the second transmission command and based on the indicator associated with second user, transmit a gift card value from the first client system to the second system.

17. A non-transitory computer-readable medium comprising program instructions for generating a sharable content item and enabling asymmetrical information sharing from the content item, wherein execution of the program instructions by a hardware processor directs the hardware processor to:
receive a contact request from a first client system associated with a first user, the contact request comprising an indication of contact information fields the first user will share, a connection profile of the first user, the connection profile comprising information selected by the first user;
identify, in response to the contact request, a geographic location associated with the first user;
receive from the first user a selection of a discovery mode configured to allow the first user be discovered by users in proximity to the first client system;
transmit a request to obtain a keyword comprising of non-contact information, the keyword unique to and selected by a second user;
receive the keyword;
determine an identification of the second user based on the keyword and on a proximity between the geographic location associated with the first user and a geographic location associated with the second user;
automatically generate data for displaying to the first user a visual representation associated with the second user in response to determining the identification of the second user;
receive from the first user a selection of a first transmission command;
send, based on the selection of the first transmission command, the contact request to a second client system associated with the second user while the geographic location associated with the first user is within a threshold distance from the geographic location associated with the second user;
receive from the second client system an indication of the contact information fields that the second user will share with the first user;
generate a contact for the first user, where the contact contains the shared contact information fields as indicated by the second user; and
generate a contact for the second user, where the contact contains the shared contact information fields as indicated by the first user.

* * * * *